United States Patent
Chen

(10) Patent No.: US 10,805,796 B2
(45) Date of Patent: Oct. 13, 2020

(54) METHOD AND SYSTEM FOR CONFIRMING PAIRING CONNECTION OF TERMINAL DEVICES

(71) Applicant: SHENZHEN EXCELSECU DATA TECHNOLOGY CO.,LTD., Shenzhen, Guangdong (CN)

(72) Inventor: Liuzhang Chen, Guangdong (CN)

(73) Assignee: SHENZHEN EXCELSECU DATA TECHNOLOGY CO., LTD, Shenzhen, Guangdong (CN)

( * ) Notice: Subject to any disclaimer, the term of this patent is extended or adjusted under 35 U.S.C. 154(b) by 274 days.

(21) Appl. No.: 15/756,616

(22) PCT Filed: Dec. 9, 2015

(86) PCT No.: PCT/CN2015/096826
§ 371 (c)(1),
(2) Date: Mar. 1, 2018

(87) PCT Pub. No.: WO2017/035977
PCT Pub. Date: Mar. 9, 2017

(65) Prior Publication Data
US 2018/0270659 A1    Sep. 20, 2018

(30) Foreign Application Priority Data

Sep. 2, 2015 (CN) .......................... 2015 1 0558112

(51) Int. Cl.
*H04W 12/06* (2009.01)
*H04W 76/10* (2018.01)
(Continued)

(52) U.S. Cl.
CPC ............ *H04W 12/06* (2013.01); *G06F 21/32* (2013.01); *G06F 21/445* (2013.01);
(Continued)

(58) Field of Classification Search
CPC .............................. H04W 12/06; H04B 17/318
(Continued)

(56) References Cited

U.S. PATENT DOCUMENTS

2013/0165045 A1* 6/2013 Cao ........................ H04W 4/029
455/41.2
2013/0169571 A1* 7/2013 Gai ...................... G06F 3/03547
345/173

FOREIGN PATENT DOCUMENTS

CN   104540190   4/2015
CN   104574073   4/2015
(Continued)

OTHER PUBLICATIONS

International Search Report filed in PCT/CN2015/096826 dated Jun. 14, 2016.

*Primary Examiner* — Wasika Nipa
*Assistant Examiner* — Samuel Ambaye
(74) *Attorney, Agent, or Firm* — Rankin, Hill & Clark LLP

(57) ABSTRACT

A method for confirming pairing connection of terminal devices, including: acquiring third touch slide data collected by a target second Bluetooth device via a touch sensing point thereof, if a touch slide operation is detected after a connection between the first Bluetooth device and the target second Bluetooth device is established; establishing a third touch slide variation curve device according to the third touch slide data; acquiring fourth touch slide data collected by a touch screen thereof, and establishing a fourth touch slide variation curve according to the fourth touch slide data; determining whether the third touch slide variation curve matches with the fourth touch slide variation curve or not; and disconnecting the connection with the target second
(Continued)

Bluetooth device if the third touch slide variation curve does not match with the fourth touch slide variation curve.

9 Claims, 7 Drawing Sheets

(51) Int. Cl.
*G06F 21/32* (2013.01)
*H04W 12/00* (2009.01)
*H04W 76/14* (2018.01)
*H04B 17/318* (2015.01)
*H04W 4/80* (2018.01)
*G06F 21/44* (2013.01)
*H04W 84/18* (2009.01)
*H04W 8/00* (2009.01)
*H04W 92/18* (2009.01)

(52) U.S. Cl.
CPC ............ *H04B 17/318* (2015.01); *H04W 4/80* (2018.02); *H04W 12/003* (2019.01); *H04W 76/10* (2018.02); *H04W 76/14* (2018.02); *H04W 8/005* (2013.01); *H04W 84/18* (2013.01); *H04W 92/18* (2013.01)

(58) Field of Classification Search
USPC ............................................................ 726/6
See application file for complete search history.

(56) References Cited

FOREIGN PATENT DOCUMENTS

| | | |
|---|---|---|
| CN | 104580325 | 4/2015 |
| CN | 104811896 | 7/2015 |

* cited by examiner

METHOD AND SYSTEM FOR CONFIRMING PAIRING CONNECTION OF TERMINAL DEVICES

TECHNICAL FIELD

The present application relates to the technical field of communication, and more particularly to a method and a system for confirming pairing connection of terminal devices.

BACKGROUND

In the prior art, a process of pairing connection of terminal devices (for example, a first Bluetooth device and a second Bluetooth device) typically includes the following steps:

step 1, scanning the second Bluetooth device by the first Bluetooth device;

step 2, selecting a target second Bluetooth device from scanned second Bluetooth devices by the user;

step 3, directly establishing a Bluetooth connection if the first Bluetooth device has been paired with the target second Bluetooth device;

step 4, triggering a pairing process if the first Bluetooth device never pairs with the target second Bluetooth device. If the two Bluetooth devices adopts a Justwork pairing mode, the pairing process does not require the participation of the user, however, such pairing mode has relatively low security; and if the two Bluetooth devices adopt a pair mode of inputting pairing codes, the pairing process requires the user to input a 4-to-6 number pairing code; if the two Bluetooth devices adopt a pair mode of digital comparison, users need to compare whether the six number comparison digitals displayed respectively on the screens of the first Bluetooth device and the second Bluetooth device are the same or not, and confirmation keys are pressed respectively on the two devices to finish the pairing if the two comparison digitals are the same; and step 5, establishing the Bluetooth connection between the first Bluetooth device and the target second Bluetooth device when the pairing is accomplished.

It is known from the above that no further confirmation is performed after the pairing of the existing first Bluetooth device with the existing second Bluetooth device, thus, the security is relatively low.

SUMMARY

In view of the above, embodiments of the present application provide a method and a system for confirming pairing connection of terminal devices in order to perform further confirmation after the pairing connection, thereby improving the security of the pairing connection of the terminal devices.

In a first aspect, the present application provides a method for confirming pairing connection of terminal devices, and the method comprises:

acquiring, by a first Bluetooth device, third touch slide data collected by a target second Bluetooth device via a touch sensing point thereof, if a touch slide operation is detected after a connection between the first Bluetooth device and the target second Bluetooth device is established;

establishing, by the first Bluetooth device, a third touch slide variation curve according to the third touch slide data;

acquiring, by the first Bluetooth device, fourth touch slide data collected by a touch screen thereof and establishing a fourth touch slide variation curve according to the fourth touch slide data;

determining, by the first Bluetooth device, whether the third touch slide variation curve matches with the fourth touch slide variation curve or not; and disconnecting the connection with the target second Bluetooth device if the third touch slide variation curve does not match with the fourth touch slide variation curve.

In a second aspect, the present application provides a system for confirming pairing connection of terminal devices, and the system comprises:

a first data acquisition unit, configured to acquire third touch slide data collected by a target second Bluetooth device via a touch sensing point thereof after establishment of connection with a target second Bluetooth device when a touch slide operation is detected;

a first curve establishing unit, configured to establish a third touch slide variation curve according to the third touch slide data;

a second curve establishing unit, configured to acquire fourth touch slide data collected by a touch screen of the first Bluetooth device and establish a fourth touch slide variation curve according to the fourth touch slide data;

a first determination unit, configured to determine whether the third touch slide variation curve matches with the fourth touch slide variation curve or not; and a first processing unit, configured to disconnect the connection with the target second Bluetooth device if the third touch slide variation curve does not match with the fourth touch slide variation curve.

Embodiments of the present application have the following beneficial effects when compared with the prior art: in embodiments of the present invention, after connection between the first Bluetooth device and the target second Bluetooth device has been established, the first Bluetooth device and the target second Bluetooth device respectively collect and exchange the touch slide data, the first Bluetooth device and the target second Bluetooth device respectively determine whether or not the time-relative touch position curves reflecting the touch slide data of the two sides are consistent, if they are not consistent, the connection is then disconnected, and the pairing connection is terminated. Embodiments of the present application of the present application use the comparison of the curves to further confirm the security of the connection, thereby having strong usability and applicability.

BRIEF DESCRIPTION OF THE DRAWINGS

In order to describe the technical solution of the embodiments of the present application more clear, the drawings required to be used in the embodiments or in the prior art are briefly introduced hereinbelow, apparently, the drawings described hereinbelow are only some embodiments of the present application, for the ordinary technicians in the present technical field, other drawings can be acquired according to these drawings without paying creative labors.

DETAILED DESCRIPTION OF THE EMBODIMENTS

In the following description, for purposes of explanation but not limitation, specific details, such as particular system architecture, techniques, etc., are set forth in order to provide a thorough understanding of the embodiments of the present application. However, it will be apparent to those skilled in the art that the present application may also be realized in other embodiments in the absence of such specific details. In other instances, detailed descriptions of well-known systems, devices, circuits, and methods are omitted so as not to obscure the description of the present application with unnecessary detail.

For the purpose of illustrating the technical solutions of the present invention, specific embodiments are described hereinbelow.

Figure 1:
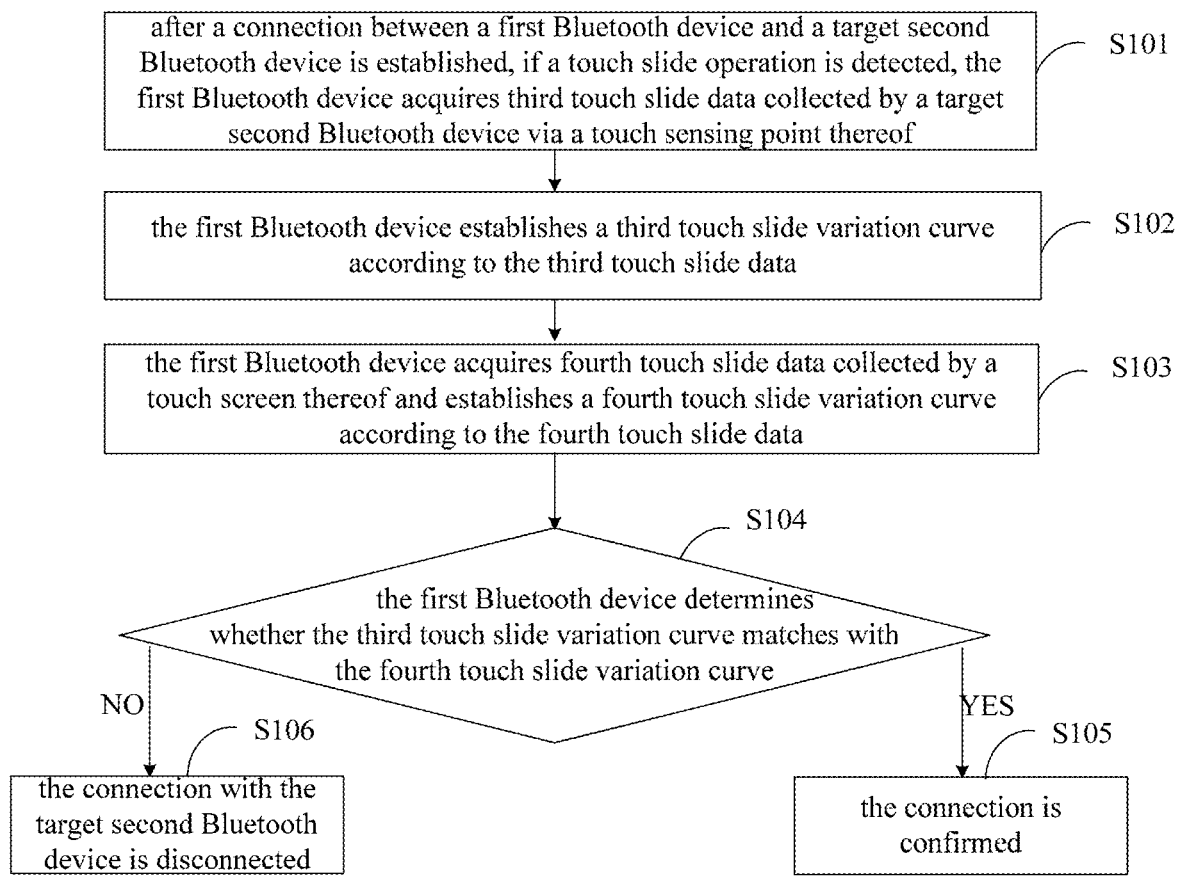
FIG. 1 is a schematic flow chart of implementation of a method for confirming pairing connection of terminal devices provided by an embodiment of the present application.

FIG. 1 illustrates an implementation process of a method for confirming a pairing connection of terminal devices provided by an embodiment of the present application. The method is applicable to the following application scenarios, that is, a target second Bluetooth device comprises multiple touch sensing points (the touch sensing points are provided on at least one edge of the second Bluetooth device, and the thickness of the edge is thin enough, such as the thickness of a standard bankcard), the target second Bluetooth device touches a touch screen of the first Bluetooth device, such that a finger of the user can simultaneously contact the touch screen of the first Bluetooth device and the touch sensing points of the second Bluetooth device. When the finger slides, the first Bluetooth device and the second Bluetooth device can simultaneously collect the touch slide data of the finger, which includes the following main steps:

S101: after a connection between a first Bluetooth device and a target second Bluetooth device is established, if a touch slide operation is detected, the first Bluetooth device acquires third touch slide data collected by the target second Bluetooth device via the touch sensing points thereof.

In this embodiment of the present application, the target second Bluetooth device is a second Bluetooth device connected to the first Bluetooth device. The first and second Bluetooth devices are terminal devices having a Bluetooth function, preferably a Bluetooth Low Energy (BLE) function with a Bluetooth 4.0 protocol, such as a smartphone, a tablet, a Bluetooth enabled Smart card, information security devices, and so on.

In this embodiment of the present invention, after the connection between the first Bluetooth device and the target second Bluetooth device has been established, if a touch slide operation (which may be a back-and-forth slide) of the user is detected, the first Bluetooth device and the second target Bluetooth device respectively collect and exchange touch slide data.

It should be noted that, after the first Bluetooth device establishes the connection with the target second Bluetooth device, both devices may interact with each other in the manner of an established Bluetooth link or a wireless communication. The third touch slide data are data generated by the current touch slide operation.

S102: the first Bluetooth device establishes a third touch slide variation curve according to the third touch slide data.

In this embodiment of the present invention, the third touch slide variation curve may be in the form of a touch point position (ordinate)-time (abscissa) curve, a velocity (ordinate)-time (abscissa) curve, an acceleration (ordinate)-time (abscissa), or other curves.

S103: the first Bluetooth device acquires fourth touch slide data collected by the touch screen thereof and establishes a fourth touch slide variation curve according to the fourth touch slide data.

In this embodiment of the present application, because the finger of the user is able to simultaneously contact the touch screen of the first Bluetooth device and the touch sensing points of the target second Bluetooth device, both the first Bluetooth device and the target second Bluetooth device can collect the touch slide data of the finger, of which, the fourth touch slide variation curve may be in the form of the touch point position (ordinate)-time (abscissa) curve, the velocity (ordinate)-time (abscissa) curve, the acceleration (ordinate)-time (abscissa), or other curves.

In addition, the fourth touch slide data are the data generated by the current touch slide operation after the first Bluetooth device establishes connection with the target second Bluetooth device.

S104: the first Bluetooth device determines whether the third touch slide variation curve matches with the fourth touch slide variation curve or not, if a determination result is "yes", S105 is executed; and if the determination result is "no", S106 is executed.

In this embodiment of the present application, the third touch slide variation curve matches with the fourth touch slide variation curve means that a change amplitude, a change period, and a form (that is, a change direction and a change rate at different time points) of both the third touch slide variation curve and the fourth touch slide variation curve are within a preset range at the same moment.

S105: the connection is confirmed.

S106: the connection with the target second Bluetooth device is disconnected.

In this embodiment of the present application, after the connection between the first Bluetooth device and the target second Bluetooth device has been established, if the touch slide operation of the user is detected (which may be the back-and-forth slide), the first Bluetooth device and the second target Bluetooth device respectively collect and exchange touch slide data. The first Bluetooth device and the target second Bluetooth device respectively determine whether the time-relative touch position curve reflected by the touch slide data collected by the two devices are consistent or not, if they are not consistent, the connection is disconnected and the pairing connection is terminated, and if they are consistent, the pairing connection is accomplished.

In this embodiment of the present application, the curves are compared to further confirm the security of the connection, thereby possessing relatively strong usability and applicability.

In addition, as a preferred embodiment of the present application, the present application may also use some of the above steps as the paring connection steps, which may be specifically as follows:

1) The first Bluetooth device receives broadcast packets broadcasted from multiple second Bluetooth devices, wherein the broadcast packets carry first touch slide data collected by the multiple second Bluetooth devices via touch sensing points thereof.

In this embodiment of the present application, the multiple second Bluetooth devices may broadcast preset broadcast packets to the surrounding according to a preset time interval under the BLE mode.

As another preferred embodiment of the present application, when the second Bluetooth device detects the touch slide operation, the touch slide data are collected via the touch sensing points, and the touch slide data are carried in the broadcast packets and broadcasted.

Optionally, in order to reduce the number of the second Bluetooth device candidates and improve the security of the pairing connection of the first Bluetooth device, this embodiment of the present application further includes:

each broadcast packet carries a manufacturer-defined field; and after the first Bluetooth device receives the broadcast packets broadcasted from the multiple second Bluetooth devices, the first Bluetooth device filters out second Bluetooth devices issued by the manufacturer according to the manufacturer-defined fields carried in the broadcast packets. That is, the first Bluetooth device only needs to focus on the second Bluetooth devices issued by the certain manufacturer, and exclude the second Bluetooth devices that are not issued by the certain manufacturer according to the manufacturer-defined fields carried in the broadcast packets.

2) The first Bluetooth device establishes multiple first touch slide variation curves according to the first touch slide data, wherein each second Bluetooth device corresponds to one of the multiple first touch slide variation curves.

In this embodiment of the present application, the first touch slide variation curve may be in the form of a touch point position (ordinate)-time (abscissa) curve, a velocity (ordinate)-time (abscissa) curve, an acceleration (ordinate)-time (abscissa), or other curves.

Each of the second Bluetooth devices corresponds to one first touch slide variation curve. Specifically, corresponding first touch slide data are acquired according to the broadcast packet sent by each of the second Bluetooth devices, and the first touch slide variation curve corresponding to the second Bluetooth device is established according to the first touch slide data.

3) The first Bluetooth device acquires second touch slide data collected by the touch screen thereof and establishes a second touch slide variation curve according to the second touch slide data.

In this embodiment of the present application, the first Bluetooth device can receive the broadcast packets, acquire the second touch slide data collected by the touch screen thereof, and establish the second touch slide variation curve according to the second touch slide data. The second touch slide variation curve may be in the form of the touch point position (ordinate)-time (abscissa) curve, the velocity (ordinate)-time (abscissa) curve, the acceleration (ordinate)-time (abscissa), or other curves.

4) The first Bluetooth device searches a target second Bluetooth device of which the first touch slide variation curve matches with the second touch slide variation curve.

Specifically, the first Bluetooth device searches a first touch slide variation curve that matches with the second touch slide variation curve from the multiple first touch slide variation curves according to the second touch slide variation curve, and uses the second Bluetooth device corresponding to the matched first touch slide variation curve as the target second Bluetooth device.

It should be noted that, in this embodiment of the present application, the first touch slide variation curve matches with the second touch slide variation curve means that a change amplitude, a change period, and a form (that is, a change direction and a change rate at different time points) of both the first touch slide variation curve and the second touch slide variation curve are within a preset range at the same moment.

5) After the target second Bluetooth device of which the first touch slide variation curve matches with the second touch slide variation curve has been searched out by the first Bluetooth device, a connection request is sent from the first Bluetooth device to the target second Bluetooth device for establishing the connection.

In this embodiment of the present application, the manner of establishing the connection may be the connection adopting a justwork manner, or the connection adopting any existing pairing manner, which is not limited herein.

Further, in order to enhance the user experience and facilitate the user to more intuitively understand the pairing connection process, the embodiment of the present application further includes:

graphically showing a process of pairing connection between the first Bluetooth device and the second Bluetooth device.

Optionally, in order to further enhance the usability and the applicability, this embodiment of the present application further comprises:

In the first Bluetooth device and/or the second Bluetooth device, a function of confirming the pairing connection and canceling the pairing connection is added. Specifically, a button for confirming the pairing connection and canceling the pairing connection or a preset operation gesture may be added to the first Bluetooth device and/or the second Bluetooth device, so that when the user triggers the button or the operation gesture, the first Bluetooth device or the second Bluetooth device performs a corresponding function of confirming the pairing connection or cancelling the pairing connection, for example, sliding clockwisely on the touch screen of the first Bluetooth device or the second Bluetooth device to execute the function of confirming the pairing connection, and sliding anticlockwisely on the touch screen of the first Bluetooth device or the second Bluetooth device to execute the function of cancelling the pairing connection.

By this embodiment of the present application, the process of the pairing connection between the first Bluetooth device and the second Bluetooth device is simpler, more convenient, and more secure, which greatly improves the user experience.

It should be noted that this embodiment is preferably applied to the following scenario: that is, the first Bluetooth device and the multiple second Bluetooth devices are included, and each second Bluetooth device includes multiple touch sensing points (an interval between adjacent touch points is small enough), one of the multiple second Bluetooth devices touches the touch screen of the first Bluetooth device (the second Bluetooth device is thin enough, such as the thickness of a standard bank card), such that the finger of the user is able to simultaneously contact the touch screen of the first Bluetooth device and the touch sensing points of the target second Bluetooth device, and when the finger slides, both the first Bluetooth device and the target second Bluetooth device can simultaneously collect the touch slide data of the finger.

Figure 2:
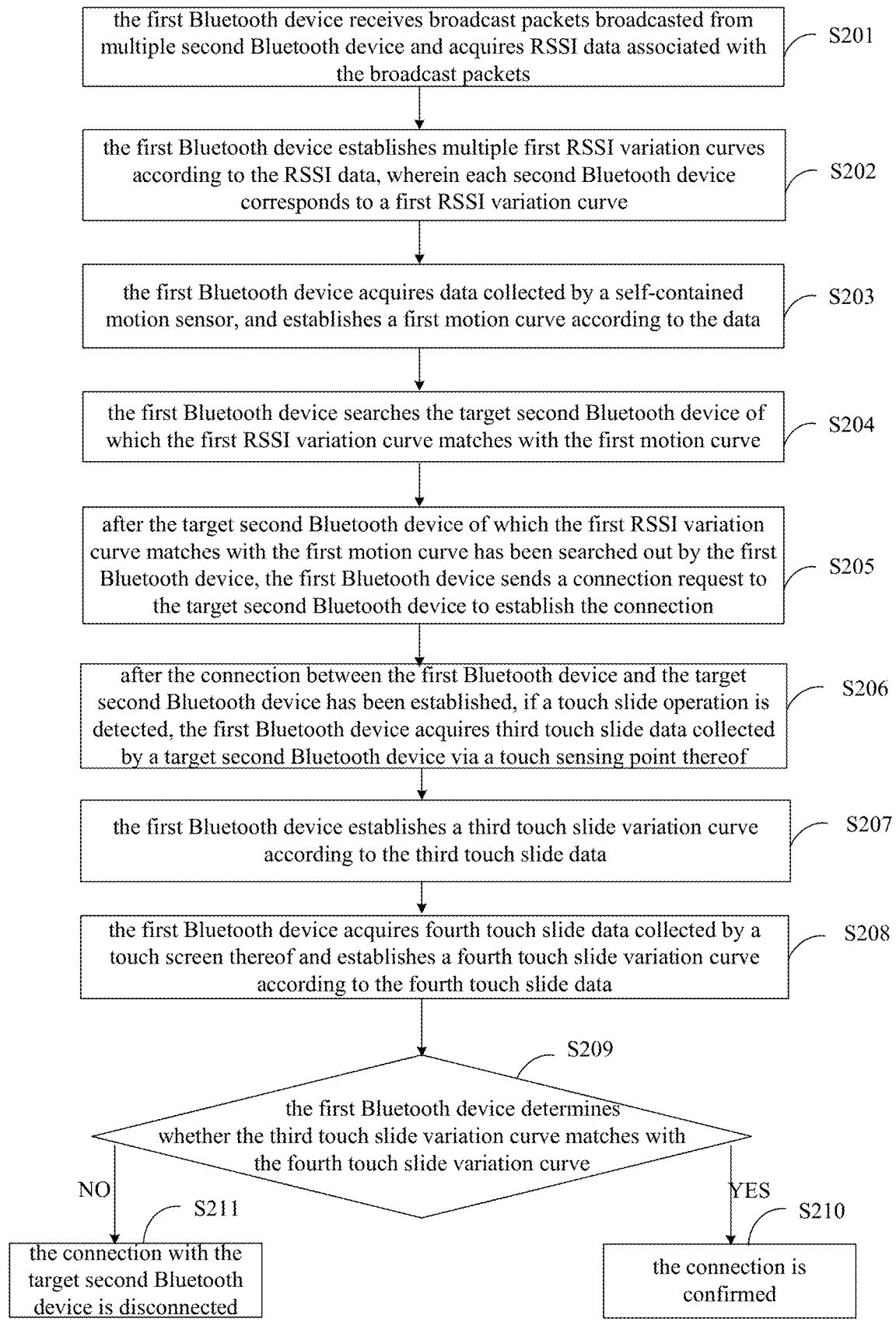
FIG. 2 is a schematic flow chart of implementation of a method for confirming pairing connection of terminal devices provided by another embodiment of the present application.

FIG. 2 illustrates an implementation process of a method for confirming the pairing connection of terminal devices provided by another embodiment of the present application, which includes the following main steps:

S201: the first Bluetooth device receives broadcast packets broadcasted from multiple second Bluetooth devices and acquires Received Signal Strength Indicator (RSSI) data associated with the broadcast packets.

In this embodiment of the present application, the multiple second Bluetooth devices can broadcast preset broadcast packets to the surrounding under the BLE mode according to a preset time interval. The first Bluetooth device can receive the broadcast packets from the multiple second Bluetooth devices and acquire the RSSI data associated with the broadcast packets. The time interval can be between 20 ms and 10.24 s.

As a preferred embodiment of the present application, in order to reduce the number of the second Bluetooth device candidates and improve the security of the pairing connection of the first Bluetooth device, this embodiment of the present application further includes:

each broadcast packet carries a manufacturer-defined field; and after the first Bluetooth device receives the broadcast packets broadcasted from the multiple second Bluetooth devices, the first Bluetooth device filters out second Bluetooth devices issued by the manufacturer according to the manufacturer-defined fields carried in the broadcast packets. That is, the first Bluetooth device only needs to focus on the second Bluetooth devices issued by the certain manufacturer, and exclude the second Bluetooth devices that are not issued by the certain manufacturer according to the manufacturer-defined fields carried in the broadcast packets.

In S202, the first Bluetooth device establishes multiple first RSSI variation curves according to the RSSI data, wherein each second Bluetooth device corresponds to a first RSSI variation curve.

In this embodiment of the present application, the first RSSI variation curve may be in the form of a distance (ordinate)-time (abscissa) curve, a velocity (ordinate)-time (abscissa) curve, an acceleration (ordinate)-time (abscissa), RSSI data (ordinate)-distance (abscissa), or other curves.

Each of the second Bluetooth devices corresponds to one first RSSI variation curve. Specifically, multiple associated RSSI data are acquired according to multiple broadcast packets sent by each of the second Bluetooth devices, and the first RSSI variation curve corresponding to the second Bluetooth device is established according to the multiple RSSI data.

In S203, the first Bluetooth device acquires data collected by a self-contained motion sensor, and establishes a first motion curve according to the data.

In this embodiment of the present application, the first Bluetooth device can receive the broadcast packets, collects the motion data of the first Bluetooth device by the self-contained motion sensor, and establishes the first motion curve according to the motion data. The first motion curve can be a distance (ordinate)-time (abscissa) curve, a velocity (ordinate)-time (abscissa) curve, an acceleration (ordinate)-time (abscissa), or other curves.

Optionally, the first Bluetooth device can receive the broadcast packets during the motion process (the motion makes the distance between the first Bluetooth device and the second Bluetooth device change), acquire the RSSI data associated with the broadcast packets, and collect the motion data of the first Bluetooth device via the self-contained motion sensor thereof.

For example, the user opens the motion sensor by an application of the first Bluetooth device, and vertically shakes the first Bluetooth device along the second Bluetooth device <-> the first Bluetooth device in the proximity of the second Bluetooth device (within a distance of 1 meter), that is, a relative space direction between the second Bluetooth device and the first Bluetooth device are remained unchanged, only the distance changes, the distance variation between the second Bluetooth device and the first Bluetooth device within 1 meter will cause the obvious change of the RSSI value, the first Bluetooth device collects the motion data of the first Bluetooth via the motion sensor, receives the broadcast packet from the second Bluetooth device, and records the RSSI data associated with the broadcast packet.

In S204, the first Bluetooth device searches the target second Bluetooth device of which the first RSSI variation curve matches with the first motion curve.

Specifically, the first Bluetooth device searches a first RSSI variation curve that matches with the first motion curve from the multiple first RSSI variation curves according to the first motion curve, and uses the second Bluetooth device corresponding to the matched first RSSI variation curve as the target second Bluetooth device.

It should be noted that, in this embodiment of the present application, the first RSSI variation curve matches with the first motion curve does not necessarily require the two curves be totally consistent, a change amplitude, a change period, and a form (that is, a change direction and a change rate at different time points) of both the first RSSI variation curve and the first motion curve are within a preset range at the same moment.

In S205, after the target second Bluetooth device of which the first RSSI variation curve matches with the first motion curve has been searched out by the first Bluetooth device, the first Bluetooth device sends a connection request to the target second Bluetooth device to establish the connection.

In this embodiment of the present application, the manner of establishing the connection may be the connection adopting a justwork manner, or the connection adopting any existing pairing manner, which is not limited herein.

Further, in order to enhance the user experience and facilitate the user to more intuitively understand the pairing connection process, the embodiment of the present application further includes:

graphically showing a process of pairing connection between the first Bluetooth device and the second Bluetooth device. Exemplarily, the display of the first Bluetooth device and/or the display of the second Bluetooth device show the motion state of the other, for example the display of the second Bluetooth device shows a moving ball, and the motion of the first Bluetooth device or the variation of the RSSI value are reflected by the moving ball.

Optionally, in order to further enhance the usability and the applicability, this embodiment of the present application further comprises:

In the first Bluetooth device and/or the second Bluetooth device, a function of confirming the pairing connection and canceling the pairing connection is added. Specifically, a button for confirming the pairing connection and canceling the pairing connection or a preset operation gesture may be added to the first Bluetooth device and/or the second Bluetooth device, so that when the user triggers the button or the operation gesture, the first Bluetooth device or the second Bluetooth device performs a corresponding function of confirming the pairing connection or cancelling the pairing connection, for example, sliding clockwisely on the touch screen of the first Bluetooth device or the second Bluetooth device to execute the function of confirming the pairing connection, and sliding anticlockwisely on the touch screen of the first Bluetooth device or the second Bluetooth device to execute the function of cancelling the pairing connection.

By this embodiment of the present application, the process of the pairing connection between the first Bluetooth device and the second Bluetooth device is simpler, more convenient, and more secure, which greatly improves the user experience.

S206: after the connection between the first Bluetooth device and the target second Bluetooth device has been established, if a touch slide operation is detected, the first Bluetooth device acquires third touch slide data collected by the target second Bluetooth device via the touch sensing points thereof.

S207: the first Bluetooth device establishes a third touch slide variation curve according to the third touch slide data.

S208: the first Bluetooth device acquires fourth touch slide data collected by a touch screen thereof and establishes a fourth touch slide variation curve according to the fourth touch slide data.

S209: the first Bluetooth device determines whether the third touch slide variation curve matches with the fourth touch slide variation curve or not, if a determination result is "yes", S210 is executed; and if the determination result is "no", S211 is executed.

S210: the connection is confirmed.

S211: the connection with the target second Bluetooth device is disconnected.

For specific implementation process of step S206 to step S211 in this embodiment of the present application, reference may be made to step S101 to step 106 in the embodiment corresponding to FIG. 1, and details are not described herein again.

In this embodiment of the present application, the target second Bluetooth device is searched out by matching the RSSI variation curve of the second Bluetooth device with the motion curve of the first Bluetooth device so that the pairing connection process is safe, easy, and fast, and the user experience is effectively improved. Moreover, the security of the connection can be further improved by confirmation after the connection.

Figure 3:
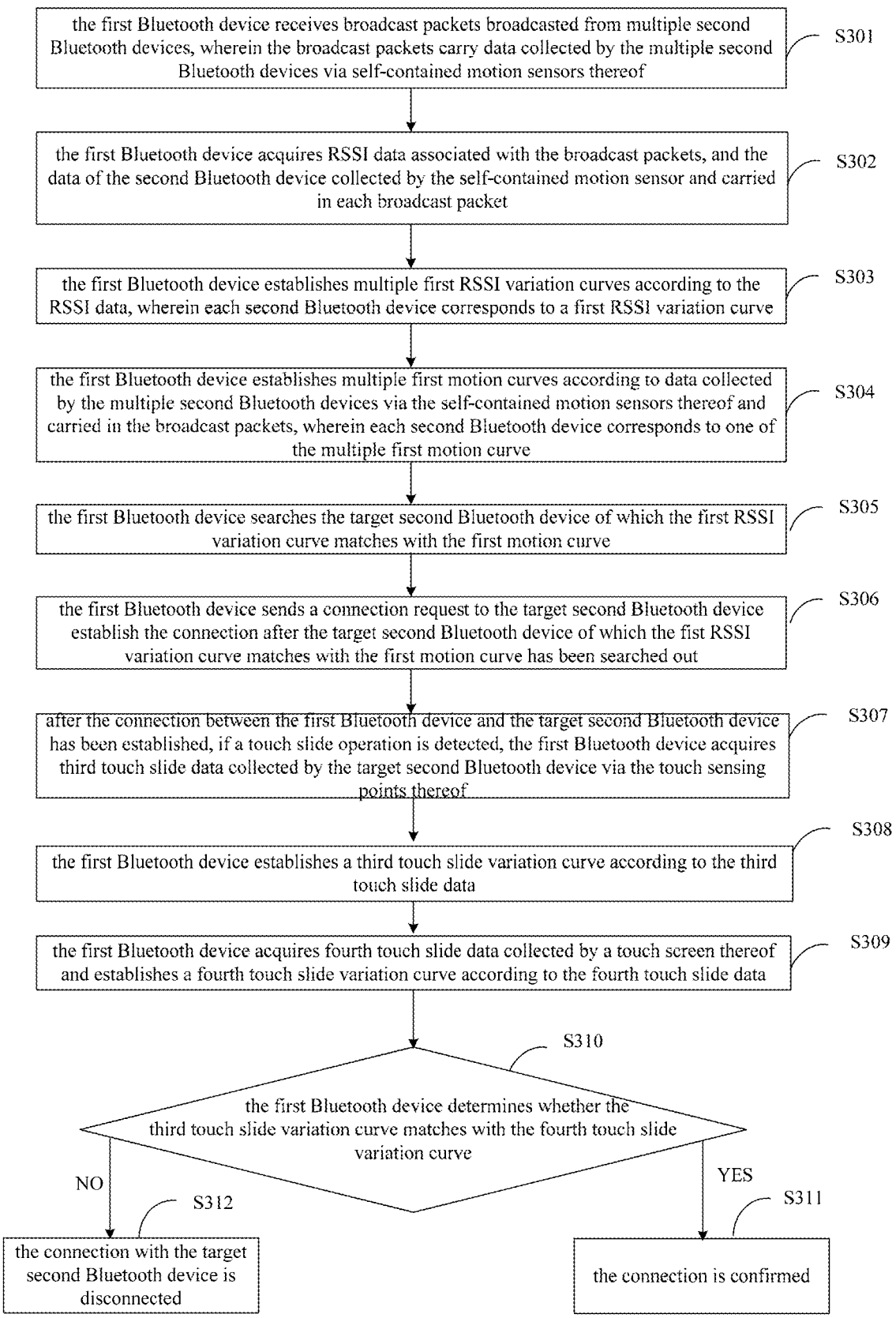
FIG. 3 is a schematic flow chart of implementation of a method for confirming pairing connection of terminal devices provided by still another embodiment of the present application.

FIG. 3 illustrates an implementation process of a method for confirming the pairing connection of terminal devices provided by another embodiment of the present application, which includes the following main steps:

S301: the first Bluetooth device receives broadcast packets broadcasted from multiple second Bluetooth devices, wherein the broadcast packets carry data collected by the multiple second Bluetooth devices via self-contained motion sensors thereof.

In this embodiment of the present application, the multiple second Bluetooth devices can broadcast preset broadcast packets to the surrounding under the BLE mode according to a preset time interval. The first Bluetooth device can receive the broadcast packets from the multiple second Bluetooth devices and acquire the RSSI data associated with the broadcast packets. The time interval can be between 20 ms and 10.24 s.

As a preferred embodiment of the present application, in order to reduce the number of the second Bluetooth device candidates and improve the security of the pairing connection of the first Bluetooth device, this embodiment of the present application further includes:

each broadcast packet carries a manufacturer-defined field; and after the first Bluetooth device receives the broadcast packets broadcasted from the multiple second Bluetooth devices, the first Bluetooth device filters out second Bluetooth devices issued by the manufacturer according to the manufacturer-defined fields carried in the broadcast packets. That is, the first Bluetooth device only needs to focus on the second Bluetooth devices issued by the certain manufacturer, and exclude the second Bluetooth devices that are not issued by the certain manufacturer according to the manufacturer-defined fields carried in the broadcast packets.

As another preferred example of the present application, each broadcast packet further carries data of the second Bluetooth device collected by the self-contained motion sensor thereof.

S302: the first Bluetooth device acquires RSSI data associated with the broadcast packets, and the data of the second Bluetooth device collected by the self-contained motion sensor and carried in each broadcast packet.

In this embodiment of the present application, the first Bluetooth device can receive the broadcast packets during the movement together with the second Bluetooth device or during the movement of the second Bluetooth device while the first Bluetooth device keeps static, acquire the RSSI data associated with the broadcast packets and the data of the second Bluetooth device collected by the self-contained motion sensor and carried in the broadcast packets.

S303: the first Bluetooth device establishes multiple first RSSI variation curves according to the RSSI data, wherein each second Bluetooth device corresponds to a first RSSI variation curve.

In this embodiment of the present application, the first RSSI variation curve may be in the form of a distance (ordinate)-time (abscissa) curve, a velocity (ordinate)-time (abscissa) curve, an acceleration (ordinate)-time (abscissa), RSSI data (ordinate)-distance (abscissa), or other curves.

Each of the second Bluetooth devices corresponds to one first RSSI variation curve. Specifically, multiple associated RSSI data are acquired according to multiple broadcast packets sent by each of the second Bluetooth devices, and the first RSSI variation curve corresponding to the second Bluetooth device is established according to the multiple RSSI data.

In S304, the first Bluetooth device establishes multiple first motion curves according to data collected by the multiple second Bluetooth devices via the self-contained motion sensors thereof and carried in the broadcast packets, wherein each second Bluetooth device corresponds to one of the multiple first motion curve.

In this embodiment of the present application, the first motion curve may be in the form of a distance (ordinate)-time (abscissa) curve, a velocity (ordinate)-time (abscissa) curve, an acceleration (ordinate)-time (abscissa), RSSI data (ordinate)-distance (abscissa), or other curves.

In S305, the first Bluetooth device searches the target second Bluetooth device of which the first RSSI variation curve matches with the first motion curve.

In this embodiment of the present application, the first RSSI variation curve matches with the first motion curve does not necessarily require the two curves be totally consistent, a change amplitude, a change period, and a form (that is, a change direction and a change rate at different time points) of both the first RSSI variation curve and the first motion curve are within a preset range at the same moment.

In S306, the first Bluetooth device sends a connection request to the target second Bluetooth device establish the connection after the target second Bluetooth device of which the first RSSI variation curve matches with the first motion curve has been searched out.

In this embodiment of the present application, the manner of establishing the connection may be the connection adopting a justwork manner, or the connection adopting any existing pairing manner, which is not limited herein.

Further, in order to enhance the user experience and facilitate the user to more intuitively understand the pairing connection process, the embodiment of the present application further includes:

graphically showing a process of pairing connection between the first Bluetooth device and the second Bluetooth device. Exemplarily, the display of the first Bluetooth device and/or the display of the second Bluetooth device show the motion state of the other, for example the display of the second Bluetooth device shows a moving ball, and the motion of the first Bluetooth device or the variation of the RSSI value are reflected by the moving ball.

Optionally, in order to further enhance the usability and the applicability, this embodiment of the present application further comprises:

In the first Bluetooth device and/or the second Bluetooth device, a function of confirming the pairing connection and canceling the pairing connection is added. Specifically, a button for confirming the pairing connection and canceling the pairing connection or a preset operation gesture may be added to the first Bluetooth device and/or the second Bluetooth device, so that when the user triggers the button or the operation gesture, the first Bluetooth device or the second Bluetooth device performs a corresponding function of confirming the pairing connection or cancelling the pairing connection, for example, sliding clockwisely on the touch screen of the first Bluetooth device or the second Bluetooth device to execute the function of confirming the pairing connection, and sliding anticlockwisely on the touch screen of the first Bluetooth device or the second Bluetooth device to execute the function of cancelling the pairing connection.

S307: after the connection between the first Bluetooth device and the target second Bluetooth device has been established, if a touch slide operation is detected, the first Bluetooth device acquires third touch slide data collected by the target second Bluetooth device via the touch sensing points thereof.

S308: the first Bluetooth device establishes a third touch slide variation curve according to the third touch slide data.

S309: the first Bluetooth device acquires fourth touch slide data collected by a touch screen thereof and establishes a fourth touch slide variation curve according to the fourth touch slide data.

S310: the first Bluetooth device determines whether the third touch slide variation curve matches with the fourth touch slide variation curve or not, if a determination result is "yes", S311 is executed; and if the determination result is "no", S312 is executed.

S311: the connection is confirmed.

S312: the connection with the target second Bluetooth device is disconnected.

For specific implementation process of step S307 to step S312 in this embodiment of the present application, reference may be made to step S101 to step 106 in the embodiment corresponding to FIG. 1, and details are not described herein again.

In this embodiment of the present application, the target second Bluetooth device is searched out by matching the RSSI variation curve of the second Bluetooth device with the motion curve of the second Bluetooth device so that the pairing connection process is safe, easy, and fast, and the user experience is effectively improved. Moreover, the security of the connection can be further improved by confirmation after the connection.

Figure 4:
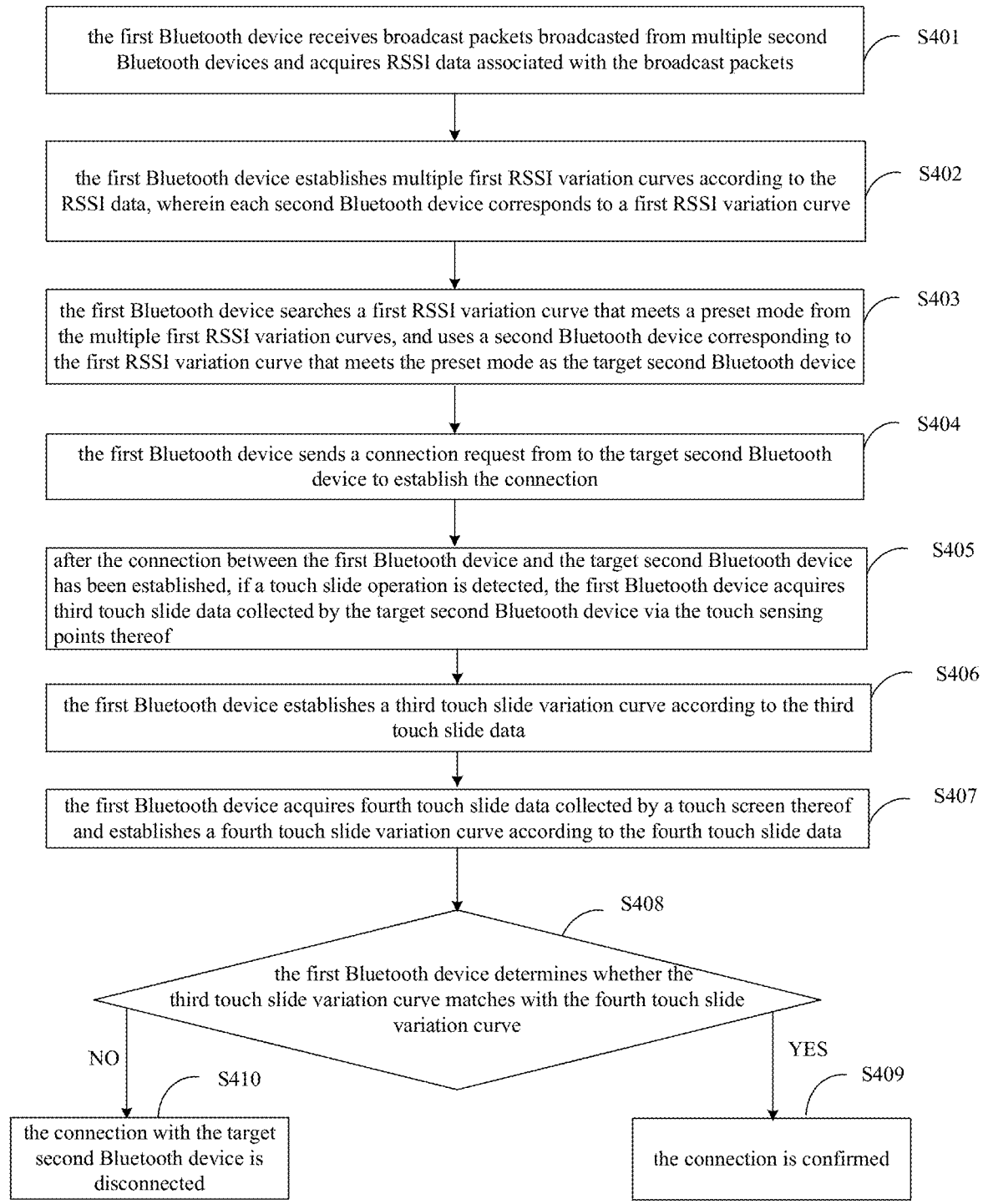
FIG. 4 is a schematic flow chart of implementation of a method for confirming pairing connection of terminal devices provided by still another embodiment of the present application.

FIG. 4 illustrates an implementation process of a method for confirming the pairing connection of terminal devices provided by another embodiment of the present application, which includes the following main steps:

S401, the first Bluetooth device receives broadcast packets broadcasted from multiple second Bluetooth devices and acquires RSSI data associated with the broadcast packets.

In this embodiment of the present application, the multiple second Bluetooth devices can broadcast preset broadcast packets to the surrounding under the BLE mode according to a preset time interval. The first Bluetooth device can receive the broadcast packets from the multiple second Bluetooth devices and acquire the RSSI data associated with the broadcast packets. The time interval can be from 20 ms to 10.24 s.

As a preferred embodiment of the present application, in order to reduce the number of the second Bluetooth device candidates and improve the security of the pairing connection of the first Bluetooth device, this embodiment of the present application further includes:

each broadcast packet carries a manufacturer-defined field; and after the first Bluetooth device receives the broadcast packets broadcasted from the multiple second Bluetooth devices, the first Bluetooth device filters out second Bluetooth devices issued by the manufacturer according to the manufacturer-defined fields carried in the broadcast packets. That is, the first Bluetooth device only needs to focus on the second Bluetooth devices issued by the certain manufacturer, and exclude the second Bluetooth devices that are not issued by the certain manufacturer according to the manufacturer-defined fields carried in the broadcast packets.

Optionally, the first Bluetooth device can receive the broadcast packets during the motion process (the motion makes the distance between the first Bluetooth device and the second Bluetooth device change), acquire the RSSI data associated with the broadcast packets. It can be understood that the distance between the first Bluetooth device and the second Bluetooth device may change by a moving second Bluetooth device.

In S402: the first Bluetooth device establishes multiple first RSSI variation curves according to the RSSI data, wherein each second Bluetooth device corresponds to a first RSSI variation curve.

In this embodiment of the present application, the first RSSI variation curve may be in the form of a distance (ordinate)-time (abscissa) curve, a velocity (ordinate)-time (abscissa) curve, an acceleration (ordinate)-time (abscissa), RSSI data (ordinate)-distance (abscissa), or other curves.

Each of the second Bluetooth devices corresponds to one first RSSI variation curve. Specifically, multiple associated RSSI data are acquired according to multiple broadcast packets sent by each of the second Bluetooth devices, and the first RSSI variation curve corresponding to the second Bluetooth device is established according to the multiple RSSI data.

In S403: the first Bluetooth device searches a first RSSI variation curve that meets a preset mode from the multiple first RSSI variation curves, and uses a second Bluetooth device corresponding to the first RSSI variation curve that meets the preset mode as the target second Bluetooth device.

In this embodiment of the present application, the first RSSI variation curve meeting the preset mode can be a variation curve where the RSSI variation amplitude is within a preset range and/or the RSSI variation period meets a special rule.

It should be noted that when multiple second Bluetooth devices that correspond to multiple first RSSI variation curves meeting the preset modes exist, any one of the second Bluetooth devices or one second Bluetooth device that meets the preset conditions (such as selecting the one at a nearest distance) can be selected as the target second Bluetooth device.

In S404, the first Bluetooth device sends a connection request from to the target second Bluetooth device to establish the connection.

In this embodiment of the present application, the manner of establishing the connection may be the connection adopting a justwork manner, or the connection adopting any existing pairing manner, which is not limited herein.

Further, in order to enhance the user experience and facilitate the user to more intuitively understand the pairing connection process, the embodiment of the present application further includes:

graphically showing a process of pairing connection between the first Bluetooth device and the second Bluetooth device. Exemplarily, the display of the first Bluetooth device and/or the display of the second Bluetooth device show the motion state of the other, for example the display of the second Bluetooth device shows a moving ball, and the motion of the first Bluetooth device or the variation of the RSSI value are reflected by the moving ball.

Optionally, in order to further enhance the usability and the applicability, this embodiment of the present application further comprises:

In the first Bluetooth device and/or the second Bluetooth device, a function of confirming the pairing connection and canceling the pairing connection is added. Specifically, a button for confirming the pairing connection and canceling the pairing connection or a preset operation gesture may be added to the first Bluetooth device and/or the second Bluetooth device, so that when the user triggers the button or the operation gesture, the first Bluetooth device or the second Bluetooth device performs a corresponding function of confirming the pairing connection or cancelling the pairing connection, for example, sliding clockwisely on the touch screen of the first Bluetooth device or the second Bluetooth device to execute the function of confirming the pairing connection, and sliding anticlockwisely on the touch screen of the first Bluetooth device or the second Bluetooth device to execute the function of cancelling the pairing connection.

S405: after the connection between the first Bluetooth device and the target second Bluetooth device has been established, if a touch slide operation is detected, the first Bluetooth device acquires third touch slide data collected by the target second Bluetooth device via the touch sensing points thereof.

S406: the first Bluetooth device establishes a third touch slide variation curve according to the third touch slide data.

S407: the first Bluetooth device acquires fourth touch slide data collected by a touch screen thereof and establishes a fourth touch slide variation curve according to the fourth touch slide data.

S408: the first Bluetooth device determines whether the third touch slide variation curve matches with the fourth touch slide variation curve or not, if a determination result is "yes", S409 is executed; and if the determination result is "no", S410 is executed.

S409: the connection is confirmed.

S410: the connection with the target second Bluetooth device is disconnected.

For specific implementation process of step S405 to step S410 in this embodiment of the present application, reference may be made to step S101 to step 106 in the embodiment corresponding to FIG. 1, and details are not described herein again.

In this embodiment of the present application, the second Bluetooth device corresponding to the first RSSI variation curve meeting the preset mode is used as the target second Bluetooth device, and the connection request is sent to the target second Bluetooth device so as to establish the connection. Compared with the prior art, on the premise of ensuring relatively high security, the pairing connection process of this embodiment of the present application reduces the manual operation, improves the efficiency of the pairing connection of the terminal devices, and improves the user experience. Moreover, the security of the connection can be further improved by the confirmation after the connection.

Figure 5:
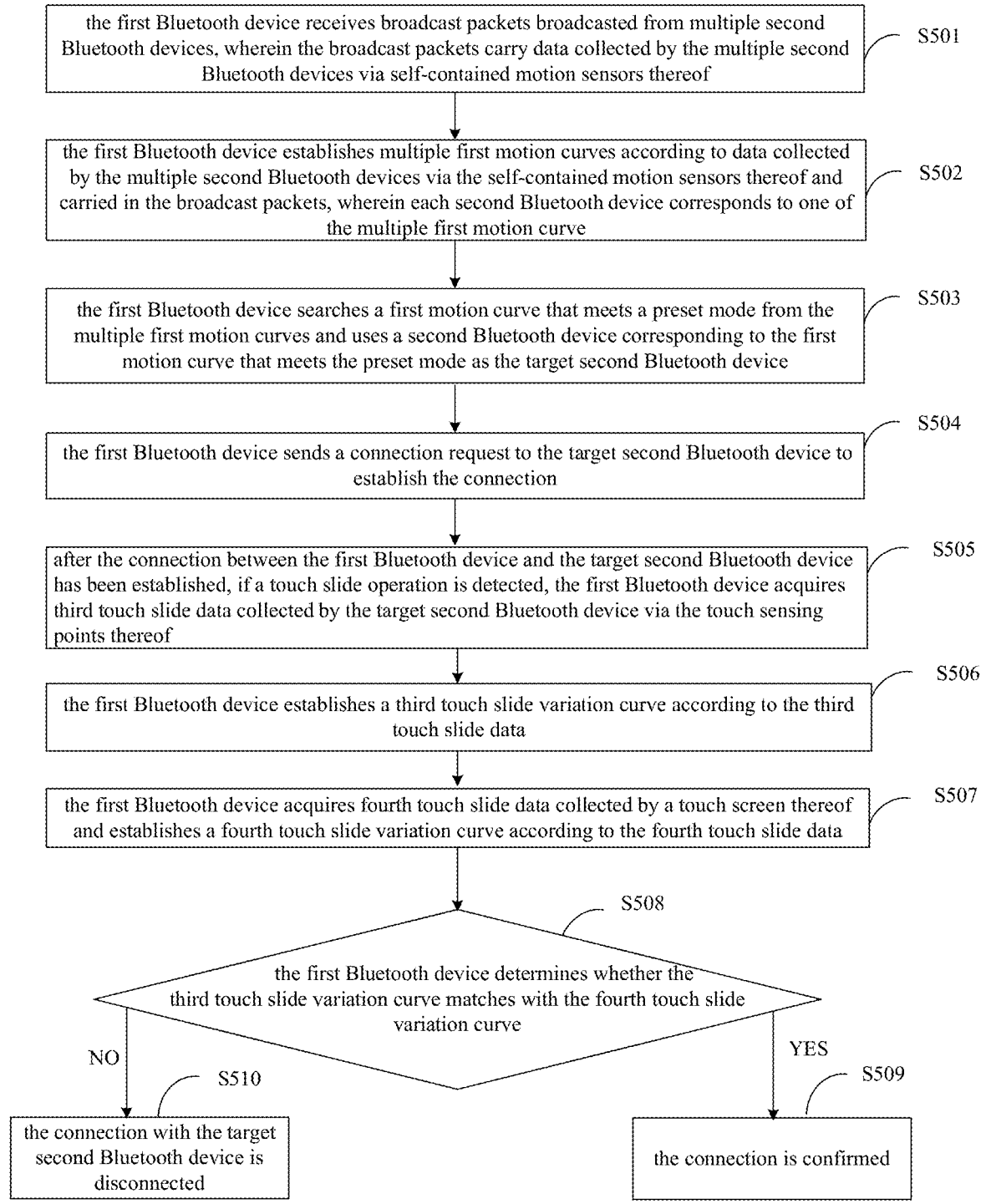
FIG. 5 is a schematic flow chart of implementation of a method for confirming pairing connection of terminal devices provided by still another embodiment of the present application.

FIG. 5 illustrates an implementation process of a method for confirming the pairing connection of terminal devices provided by another embodiment of the present application, which includes the following main steps:

S501, the first Bluetooth device receives broadcast packets broadcasted from multiple second Bluetooth devices, wherein the broadcast packets carry data collected by the multiple second Bluetooth devices via self-contained motion sensors thereof.

In this embodiment of the present application, the multiple second Bluetooth devices can broadcast preset broadcast packets to the surrounding under the BLE mode according to a preset time interval. The first Bluetooth device carries data of the second Bluetooth device collected by the self-contained motion sensor. The time interval can be from 20 ms to 10.24 s.

As a preferred embodiment of the present application, in order to reduce the number of the second Bluetooth device candidates and improve the security of the pairing connection of the first Bluetooth device, this embodiment of the present application further includes:

each broadcast packet carries a manufacturer-defined field; and after the first Bluetooth device receives the broadcast packets broadcasted from the multiple second Bluetooth devices, the first Bluetooth device filters out second Bluetooth devices issued by the manufacturer according to the manufacturer-defined fields carried in the broadcast packets. That is, the first Bluetooth device only needs to focus on the second Bluetooth devices issued by the certain manufacturer, and exclude the second Bluetooth devices that are not issued by the certain manufacturer according to the manufacturer-defined fields carried in the broadcast packets.

In S502, the first Bluetooth device establishes multiple first motion curves according to data collected by the multiple second Bluetooth devices via the self-contained motion sensors thereof and carried in the broadcast packets, wherein each second Bluetooth device corresponds to one of the multiple first motion curve.

In this embodiment of the present application, the first motion curve may be in the form of a distance (ordinate)-time (abscissa) curve, a velocity (ordinate)-time (abscissa) curve, an acceleration (ordinate)-time (abscissa), or other curves.

In S503, the first Bluetooth device searches a first motion curve that meets a preset mode from the multiple first motion curves and uses a second Bluetooth device corresponding to the first motion curve that meets the preset mode as the target second Bluetooth device.

In this embodiment of the present application, the first motion curve meeting the preset mode can be a variation curve where the variation amplitude of the curve is within a preset range and/or the variation period of the curve meets a special rule.

It should be noted that when multiple second Bluetooth devices that correspond to multiple first RSSI variation curves meeting the preset modes exist, any one of the second Bluetooth devices or one second Bluetooth device that meets the preset conditions (such as selecting the one at a nearest distance) can be selected as the target second Bluetooth device.

Optionally, after the broadcast packets broadcasted from the multiple second Bluetooth device have been received by the first Bluetooth device, this embodiment can further comprise:

the first Bluetooth device acquires the RSSI data associated with the broadcast packets;

the step that the first Bluetooth device searches the first motion curve meeting the preset mode from the multiple first motion curves and uses the second Bluetooth device corresponding to the first motion curve meeting the preset mode as the target second Bluetooth device can comprise:

the first Bluetooth device searches a first motion curve meeting the preset mode from the multiple first motion curves, searches a second Bluetooth device of which the variation of the RSSI data is within a preset range from the second Bluetooth devices corresponding to the first motion curve meeting the preset mode, and uses the searched second Bluetooth device as the target second Bluetooth device For example, the user opens the motion sensor by an application of the first Bluetooth device, and shakes the second Bluetooth device and the first Bluetooth device together, the first Bluetooth device receives the broadcast packets broadcasted from the second Bluetooth device, acquires the data of the second Bluetooth device collected by the self-contained motion sensor and carried in the broadcast packet, and records the RSSI data associated with the broadcast packet. When the first Bluetooth device determines that the motion curve of the second Bluetooth device meets the preset mode, it is required to further determine whether the variation of the RSSI data is within the preset range or not and whether the RSSI data is always the maximum or not. It should be understood that the user may only move the second Bluetooth device, and send the motion data collected by the motion sensor of the second Bluetooth device to the first Bluetooth device, so that the first Bluetooth device determines whether the motion curve of the second Bluetooth device meets the preset mode or not.

In S504, the first Bluetooth device sends a connection request to the target second Bluetooth device to establish the connection.

In this embodiment of the present application, the manner of establishing the connection may be the connection adopting a justwork manner, or the connection adopting any existing pairing manner, which is not limited herein.

Further, in order to enhance the user experience and facilitate the user to more intuitively understand the pairing connection process, the embodiment of the present application further includes:

graphically showing a process of pairing connection between the first Bluetooth device and the second Bluetooth device. Exemplarily, the display of the first Bluetooth device and/or the display of the second Bluetooth device show the motion state of the other, for example the display of the second Bluetooth device shows a moving ball, and the motion of the first Bluetooth device or the variation of the RSSI value are reflected by the moving ball.

Optionally, in order to further enhance the usability and the applicability, this embodiment of the present application further comprises:

In the first Bluetooth device and/or the second Bluetooth device, a function of confirming the pairing connection and canceling the pairing connection is added. Specifically, a button for confirming the pairing connection and canceling the pairing connection or a preset operation gesture may be added to the first Bluetooth device and/or the second Bluetooth device, so that when the user triggers the button or the operation gesture, the first Bluetooth device or the second Bluetooth device performs a corresponding function of confirming the pairing connection or cancelling the pairing connection, for example, sliding clockwisely on the touch screen of the first Bluetooth device or the second Bluetooth device to execute the function of confirming the pairing connection, and sliding anticlockwisely on the touch screen of the first Bluetooth device or the second Bluetooth device to execute the function of cancelling the pairing connection.

S505: after the connection between the first Bluetooth device and the target second Bluetooth device has been established, if a touch slide operation is detected, the first Bluetooth device acquires third touch slide data collected by the target second Bluetooth device via the touch sensing points thereof.

S506: the first Bluetooth device establishes a third touch slide variation curve according to the third touch slide data.

S507: the first Bluetooth device acquires fourth touch slide data collected by a touch screen thereof and establishes a fourth touch slide variation curve according to the fourth touch slide data.

S508: the first Bluetooth device determines whether the third touch slide variation curve matches with the fourth touch slide variation curve or not, if a determination result is "yes", S509 is executed; and if the determination result is "no", S510 is executed.

S509: the connection is confirmed.

S510: the connection with the target second Bluetooth device is disconnected.

For specific implementation process of step S505 to step S510 in this embodiment of the present application, reference may be made to step S101 to step 106 in the embodiment corresponding to FIG. 1, and details are not described herein again.

In this embodiment of the present application, the second Bluetooth device corresponding to the first motion curve meeting the preset mode is used as the target second Bluetooth device, and the connection request is sent to the target second Bluetooth device so as to establish the connection. Compared with the prior art, on the premise of ensuring relatively high security, the pairing connection process of this embodiment of the present application reduces the manual operation, improves the efficiency of the pairing connection of the terminal devices, and improves the user experience. Moreover, the security of the connection can be further improved by the confirmation after the connection.

It should be noted that, before the first Bluetooth device establishes the connection with the target second Bluetooth device, data interaction between the two devices are performed in the manner of broadcasting; and after the connection has been established, the two devices may interact with each other in the manner of an established Bluetooth link or a wireless communication.

It should be further noted that when involving the broadcasting function, the corresponding Bluetooth device requires the function of Bluetooth Low Energy (BLE) with Bluetooth 4.0 protocol.

In addition, it should be understood that the serial numbers of different steps in embodiments corresponding to FIGS. 1-5 do not imply the execution order, the execution order of these processes should be determined according to the functions and the internal logics, but should not constitute any limitation to the implementation process of the embodiments of the present application.

Figure 6:
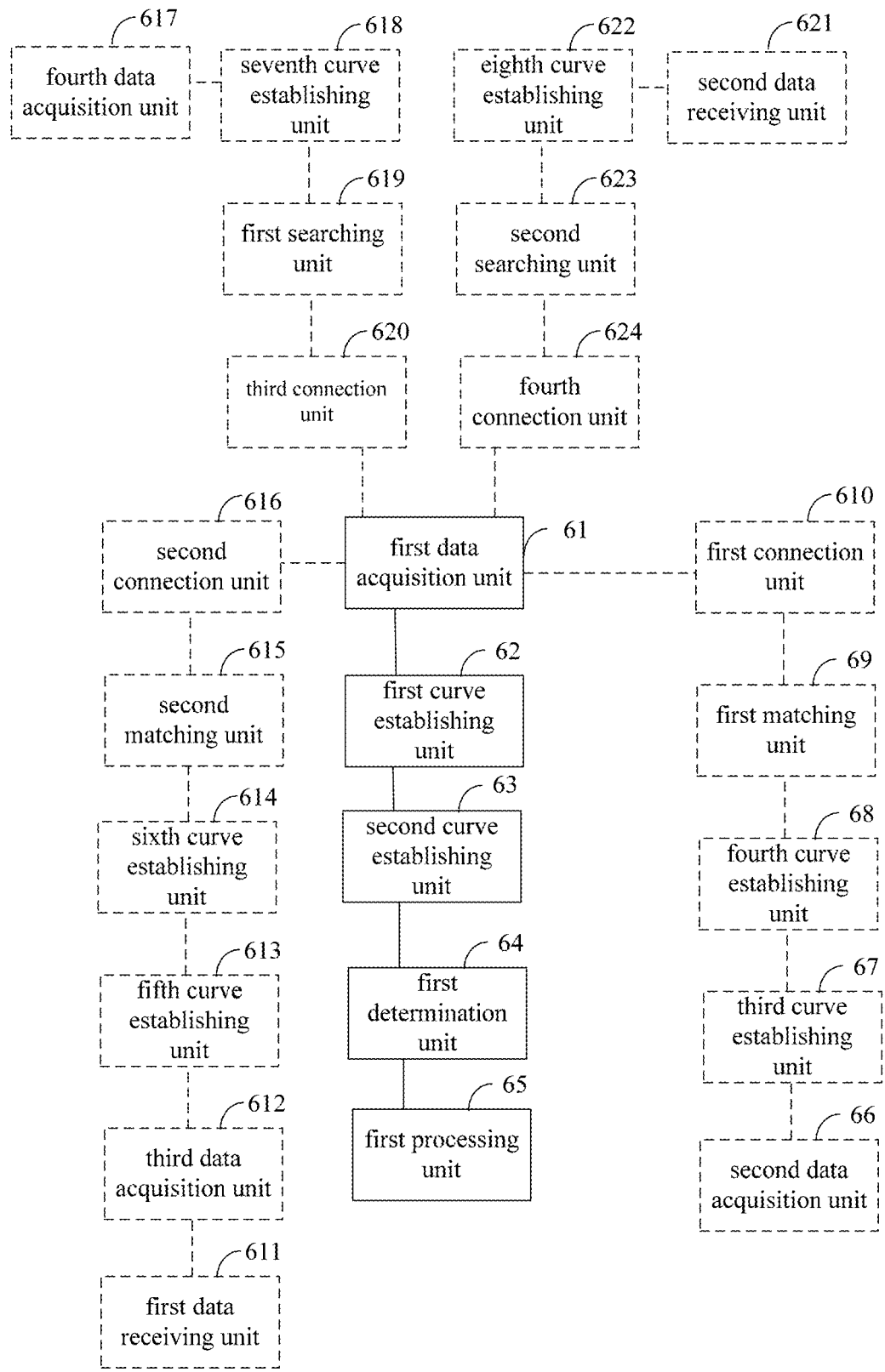
FIG. 6 is a structural schematic diagram of composition of a system for confirming pairing connection of terminal devices provided by an embodiment of the present application.

Please refer to FIG. 6, a structural schematic diagram of composition of a system for confirming pairing connection of terminal devices is shown. For facilitating the description, parts only related to the embodiments of the present application are shown.

The system for confirming pairing connection of terminal devices can be software units, hardware units, or a combination of the software units and the hardware units that are internally arranged in the first Bluetooth device.

The system for confirming pairing connection of terminal devices comprises: a first data acquisition unit 61, a first curve establishing unit 62, a first curve establishing unit 63, a first determination unit 64, and a first processing unit 65. Specific functions of these units are as follows:

a first data acquisition unit 61 is configured to acquire third touch slide data collected by a target second Bluetooth device via a touch sensing point thereof after establishment of connection with a target second Bluetooth device when a touch slide operation is detected;

a first curve establishing unit 62 is configured to establish a third touch slide variation curve according to the third touch slide data;

a second curve establishing unit 63 is configured to acquire fourth touch slide data collected by a touch screen of the first Bluetooth device and establish a fourth touch slide variation curve according to the fourth touch slide data;

a first determination unit 64 is configured to determine whether the third touch slide variation curve matches with the fourth touch slide variation curve or not; and a first processing unit 65 is configured to disconnect the connection with the target second Bluetooth device if the third touch slide variation curve does not match with the fourth touch slide variation curve.

Further, the system may further comprise:

a second data acquisition unit 66, configured to receive broadcast packets broadcasted from multiple second Bluetooth devices and acquires RSSI data associated with the broadcast packets;

a third curve establishing unit 67, configured to establish multiple first RSSI variation curves according to the RSSI data, wherein each second Bluetooth device corresponds to a first RSSI variation curve;

a fourth curve establishing unit 68, configured to acquire data collected by a self-contained motion sensor and establish a first motion curve according to the data;

a first matching unit 69, configured to search the target second Bluetooth device of which the first RSSI variation curve matches with the first motion curve; and a first connection unit 610, configured to send a connection request from the first Bluetooth device to the target second Bluetooth device to establish the connection after the target second Bluetooth device of which the first RSSI variation curve matches with the first motion curve has been searched out.

Further, the system may further comprise:

a first data receiving unit 611, configured to receive broadcast packets broadcasted from multiple second Bluetooth devices, wherein the broadcast packets carry data collected by the multiple second Bluetooth devices via self-contained motion sensors thereof;

a third data acquisition unit 612, configured to acquire RSSI data associated with the broadcast packets, and the data of the second Bluetooth device collected by the self-contained motion sensor and carried in each broadcast packet;

a fifth curve establishing unit 613, configured to establish multiple first RSSI variation curves according to the RSSI data, wherein each second Bluetooth device corresponds to a first RSSI variation curve;

a sixth curve establishing unit 614, configured to establish multiple first motion curves according to data collected by the multiple second Bluetooth devices via the self-contained motion sensors thereof and carried in the broadcast packets, wherein each second Bluetooth device corresponds to one of the multiple first motion curve;

a second matching unit 615, configured to search the target second Bluetooth device of which the first RSSI variation curve matches with the first motion curve; and a second connection unit 616, configured to send a connection request from the first Bluetooth device to the target second Bluetooth device to establish the connection after the target second Bluetooth device of which the first RSSI variation curve matches with the first motion curve has been searched out.

Further, the system may further comprise:

a fourth data acquisition unit 617, configured to receive broadcast packets broadcasted from multiple second Bluetooth devices and acquire RSSI data associated with the broadcast packets;

a seventh curve establishing unit 618, configured to establish multiple first RSSI variation curves according to the RSSI data, wherein each second Bluetooth device corresponds to a first RSSI variation curve;

a first searching unit 619, configured to search a first RSSI variation curve that meets a preset mode from the multiple first RSSI variation curves, and use a second Bluetooth device corresponding to the first RSSI variation curve that meets the preset mode as the target second Bluetooth device; and a third connection unit 620, configured to send a connection request from the first Bluetooth device to the target second Bluetooth device to establish the connection.

Further, the system may further comprise:

a second data receiving unit 621, configured to receive broadcast packets broadcasted from multiple second Bluetooth devices, wherein the broadcast packets carry data collected by the multiple second Bluetooth devices via self-contained motion sensors thereof;

an eighth curve establishing unit 622, configured to establish multiple first motion curves according to data collected by the multiple second Bluetooth devices via the self-contained motion sensors thereof and carried in the broadcast packets, wherein each second Bluetooth device corresponds to one of the multiple first motion curve;

a second searching unit 623, configured to search a first motion curve that meets a preset mode from the multiple first motion curves, and use a second Bluetooth device corresponding to the first motion curve that meets the preset mode as the target second Bluetooth device; and a fourth connection unit 624, configured to send a connection request from the first Bluetooth device to the target second Bluetooth device to establish the connection.

As another preferred embodiment of the present application, the present application also provides a system for confirming pairing connection of terminal devices, the system may also be applicable to confirm pairing connection of terminal devices, and the system comprises:

a fifth data acquisition unit, configured to receive broadcast packets broadcasted from multiple second Bluetooth devices, wherein the broadcast packets carry first touch slide data collected by the multiple second Bluetooth devices via touch sensing points thereof;

a ninth curve establishing unit, configured to establish multiple first touch slide variation curves according to the first touch slide data, wherein each second Bluetooth device corresponds to one of the multiple first touch slide variation curves;

a tenth curve establishing unit, configured to acquire second touch slide data collected by a touch screen of the first Bluetooth device and establishing a second touch slide variation curve according to the second touch slide data a third matching unit, configured to search the second touch slide variation curve of which the first touch slide variation curve matches with the target second Bluetooth device; and a fifth connection unit, configured to send a connection request from the first Bluetooth device to the target second Bluetooth device to establish the connection after the target second Bluetooth device of which the first touch slide variation curve matches with the second touch slide variation curve has been searched out.

Figure 7:
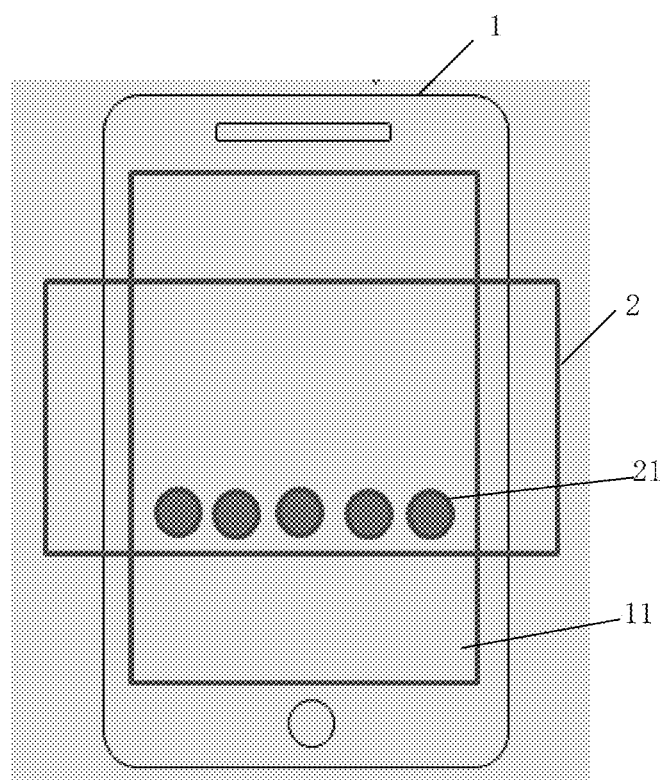
FIG. 7 is an exemplified diagram of application of the first Bluetooth device provided by embodiments of the present application with a second Bluetooth device.

For better understanding, the present application provides an example of application of a first Bluetooth device and a second Bluetooth device. As shown in FIG. 7, the second Bluetooth device 2 is disposed on the touch screen 11 of the first Bluetooth device 1, a plane where the touch sensing points 21 of the second Bluetooth device 2 is located and a plane where the touch screen 11 of the first Bluetooth device 1 face the same direction, such that a finger of the user can touch simultaneously the touch screen 11 of the first Bluetooth device 1 and the touch sensing points 21 of the second Bluetooth device 2.

In this embodiment, when the finger slides, the first Bluetooth device 1 and the second Bluetooth device 2 can simultaneously detect the touch slide operation of the finger to collect the touch slide data of the finger. The touch slide data reflect relative positions of the finger at different moments. If time-relative position curves of the finger on the two devices are consistent, it is determined that it is the same finger that slides simultaneously on the touch screen 11 of the first Bluetooth device 1 and the touch sensing points 21 of the second Bluetooth device 2, which can be used as selection, binding, and authentication.

In which, the touch slide operation can be a touch slide from one end of the touch sensing points 21 to the other end, a preset number of times (such as, once or twice) of repeats of touch slide from one end to the other end, or a preset times (such as, once or twice) of reciprocating touch slide from one end to the other end.

It should be noted that the above examples are only used for illustration and are not intended to limit the protection scope of the present application. The touch sensing points 21 can be arranged on at least one edge of the second Bluetooth device 2, to enable the user to simultaneously touch the touch screen 11 of the first Bluetooth device 1 and the touch sensing point 21 of the second Bluetooth device 2 by using one finger. It can be understood that, the touch sensing points 21 can be located at positions rather than the edge of the second Bluetooth device 2, in such condition, the user can use two fingers to simultaneously touch the touch screen 11 of the first Bluetooth device 1 and the touch sensing point 21 of the second Bluetooth device 2, respectively.

Based on the above description, after the first Bluetooth device of the embodiment of the present application establishes the connection with the target second Bluetooth device, the first Bluetooth device and the target second Bluetooth device respectively collet and exchange the touch slide data, the first Bluetooth device and the target second Bluetooth device respectively determine whether the time-relative touch position curves reflecting the touch slides of the two sides are consistent or not, if the curves are inconsistent, the connection is disconnected and the pairing connection is terminated. The embodiment of the present application uses the comparison of the curves to further confirm the security of the connection. Moreover, the target second Bluetooth device can be selected by adopting multiple selection methods, which effectively improves the efficiency of the pairing connection between terminals and possesses relatively strong usability and applicability.

Those skilled in the art may clearly understand that, for the convenience and simplicity of the description, only the division of the foregoing functional units is used as an example. In actual applications, the foregoing functions may be allocated by different functional units and modules as required, that is, the internal structure of the system is divided into different functional units or modules to complete all or part of the functions described above. Each of the functional units in the embodiments may be integrated in one processing unit, or each unit may physically exist alone or in a single unit. Two or more units may be integrated in one unit, and the integrated unit may be implemented in the form of hardware or may be implemented in the form of software functional units. In addition, the specific names of the functional units are merely for the convenience of distinguishing each other and are not intended to limit the scope of protection of the present application. For the specific working process of the unit in the above system, reference may be made to the corresponding process in the foregoing method embodiments, and details are not repeated herein again.

One of ordinary skill in the art may be aware that, the units and algorithm steps of each example described in combination with the embodiments disclosed herein may be implemented by electronic hardware or a combination of computer software and electronic hardware. Whether these functions are implemented by hardware or software depends on the specific application and design constraints of the technical solutions. A person skilled in the art may use different methods to implement the described functions for each particular application, but such implementation should not be considered as beyond the scope of the present application.

It should be understood that the systems, apparatuses and methods disclosed in some embodiments provided by the present application can also be realized in other ways. For example, the described apparatus embodiments are merely schematic; for example, the division of the units is merely a division based on logic function, whereas the units can be divided in other ways in actual realization; for example, a plurality of units or components can be grouped or integrated into another system, or some features can be omitted or not executed. Furthermore, the shown or discussed mutual coupling or direct coupling or communication connection can be achieved by indirect coupling or communication connection of some interfaces, apparatuses or units in electric, mechanical or other ways.

The units described as isolated elements can be or not be separated physically; an element shown as a unit can be or not be physical unit, which means that the element can be located in one location or distributed at multiple network units. Some or all of the units can be selected according to actual needs to achieve the purpose of the schemes of the embodiments.

Furthermore, each functional unit in each embodiment of the present application can be integrated into a processing unit, or each unit can exist in isolation, or two or more than two units can be integrated into one unit.

If the integrated unit is achieved in software functional unit and sold or used as an independent product, the integrated unit can be stored in a computer-readable storage medium. Based on this consideration, the substantial part, or the part that is contributed to the prior art of the technical solution of the present application, or part or all of the technical solutions can be embodied in a software product. The computer software product is stored in a storage medium, and includes several instructions configured to enable a computer device (can be a personal computer, device, network device, and so on) to execute all or some of the steps of the method of each embodiment of the present application. The storage medium includes a U disk, a mobile hard disk, a read-only memory (ROM, Read-Only Memory), a random access memory (RAM, Random Access Memory), a disk or a light disk, and other various mediums which can store program codes.

The foregoing embodiments are merely intended for describing the technical solutions of the present application, but not for limiting the present application. Although the present application is described in detail with reference to the foregoing embodiments, it should be understood by those skilled in the art that the foregoing embodiments may still be implemented or some of the technical features may be changed equivalently and that these modifications or replacements do not make the essence of the corresponding technical solutions depart from the spirit and scope of the technical solutions of the embodiments of the present application.

What is claimed is:

1. A method for confirming an established pairing connection between terminal devices, the method comprising:
acquiring, by a first Bluetooth device, third touch slide data collected by a target second Bluetooth device via touch sensing points thereof, if a touch slide operation is detected after establishment of a pairing connection between the first Bluetooth device and the target second Bluetooth device;
establishing, by the first Bluetooth device, a third touch slide variation curve according to the third touch slide data;
acquiring, by the first Bluetooth device, fourth touch slide data collected by a touch screen thereof and establishing a fourth touch slide variation curve according to the fourth touch slide data;
determining, by the first Bluetooth device, whether the third touch slide variation curve matches with the fourth touch slide variation curve or not; and
confirming the pairing connection between the first Bluetooth device and the target second Bluetooth device if the third touch slide variation curve matches with the fourth touch slide variation curve, or alternatively, disconnecting the pairing connection between the first Bluetooth device and the target second Bluetooth device if the third touch slide variation curve does not match with the fourth touch slide variation curve;
wherein
the operation of establishing the pairing connection between the first Bluetooth device and the target second Bluetooth device comprises:
receiving, by the first Bluetooth device, broadcast packets broadcasted from multiple second Bluetooth devices, and acquiring Received Signal Strength Indicator (RSSI) data associated with the broadcast packets;
establishing, by the first Bluetooth device, multiple first RSSI variation curves according to the RSSI data, wherein each second Bluetooth device corresponds to a first RSSI variation curve;
acquiring, by the first Bluetooth device, data collected by a self-contained motion sensor of the first Bluetooth device and establishing a first motion curve according to the data;
searching, by the first Bluetooth device, the target second Bluetooth device of which the first RSSI variation curve matches with the first motion curve; and
sending, by the first Bluetooth device, a connection request to the target second Bluetooth device to establish the connection after the target second Bluetooth device of which the fist RSSI variation curve matches with the first motion curve has been searched out.

2. A method for confirming an established pairing connection between terminal devices, the method comprising:
acquiring, by a first Bluetooth device, third touch slide data collected by a target second Bluetooth device via touch sensing points thereof, if a touch slide operation is detected after establishment of a pairing connection between the first Bluetooth device and the target second Bluetooth device;
establishing, by the first Bluetooth device, a third touch slide variation curve according to the third touch slide data;
acquiring, by the first Bluetooth device, fourth touch slide data collected by a touch screen thereof and establishing a fourth touch slide variation curve according to the fourth touch slide data;
determining, by the first Bluetooth device, whether the third touch slide variation curve matches with the fourth touch slide variation curve or not; and
confirming the pairing connection between the first Bluetooth device and the target second Bluetooth device if the third touch slide variation curve matches with the fourth touch slide variation curve, or alternatively, disconnecting the pairing connection between the first Bluetooth device and the target second Bluetooth device if the third touch slide variation curve does not match with the fourth touch slide variation curve;
wherein
the operation of establishing the pairing connection between the first Bluetooth device and the target second Bluetooth device comprises:
receiving, by the first Bluetooth device, broadcast packets broadcasted from multiple second Bluetooth devices by the first Bluetooth device, wherein the broadcast packets carry first touch slide data collected by the multiple second Bluetooth devices via touch sensing points thereof;
establishing, by the first Bluetooth device, multiple first touch slide variation curves according to the first touch slide data, wherein each second Bluetooth device corresponds to one of the multiple first touch slide variation curves;
acquiring, by the first Bluetooth device, second touch slide data collected by a touch screen of the first Bluetooth device and establishing a second touch slide variation curve according to the second touch slide data;

searching, by the first Bluetooth device, the second touch slide variation curve of which the first touch slide variation curve matches with the target second Bluetooth device; and sending, by the first Bluetooth device, a connection request to the target second Bluetooth device to establish the connection after the target second Bluetooth device of which the first touch slide variation curve matches with the second touch slide variation curve has been searched out.

3. The method of claim 2, wherein each broadcast packet carries a manufacturer-defined field; and after the first Bluetooth device receives the broadcast packets broadcasted from the multiple second Bluetooth devices, the first Bluetooth device filters out second Bluetooth devices issued by the manufacturer according to the manufacturer-defined fields carried in the broadcast packets.

4. The method of claim 2, wherein the method further comprises: graphically showing a process of pairing connection between the first Bluetooth device and the second Bluetooth device.

5. A system for confirming an established pairing connection between terminal devices, the system being included within a first Bluetooth device and comprising:

a first data acquisition circuitry, configured to acquire third touch slide data collected by a target second Bluetooth device via a touch sensing points thereof after establishment of pairing connection between the first Bluetooth device and a target second Bluetooth device when a touch slide operation is detected;

a first curve generator, configured to establish a third touch slide variation curve according to the third touch slide data;

a second curve generator, configured to acquire fourth touch slide data collected by a touch screen of the first Bluetooth device and establish a fourth touch slide variation curve according to the fourth touch slide data;

a first determination circuitry, configured to determine whether the third touch slide variation curve matches with the fourth touch slide variation curve or not;

a first processor, configured to confirm the pairing connection between the first Bluetooth device and the target second Bluetooth device if the third touch slide variation curve matches with the fourth touch slide variation curve, and to disconnect the pairing connection between the first Bluetooth device and the target second Bluetooth device if the third touch slide variation curve does not match with the fourth touch slide variation curve;

a second data acquisition circuitry, configured to receive broadcast packets broadcasted from multiple second Bluetooth devices and acquires Received Signal Strength Indicator (RSSI) data associated with the broadcast packets;

a third curve generator, configured to establish multiple first RSSI variation curves according to the RSSI data, wherein each second Bluetooth device corresponds to a first RSSI variation curve;

a fourth curve generator, configured to acquire data collected by a self-contained motion sensor and establish a first motion curve according to the data;

a first matching circuitry, configured to search the target second Bluetooth device of which the first RSSI variation curve matches with the first motion curve; and a first connector, configured to send a connection request from the first Bluetooth device to the target second Bluetooth device to establish the connection after that the target second Bluetooth device of which the fist RSSI variation curve matches with the first motion curve has been searched out.

6. The system of claim 5, wherein each broadcast packet carries a manufacturer-defined field; and after the first Bluetooth device receives the broadcast packets broadcasted from the multiple second Bluetooth devices, the first Bluetooth device filters out second Bluetooth devices issued by the manufacturer according to the manufacturer-defined fields carried in the broadcast packets.

7. The system of claim 5, wherein the system further comprises: a displayer which is configured to graphically show a process of pairing connection between the first Bluetooth device and the second Bluetooth device.

8. The method of claim 1, wherein each broadcast packet carries a manufacturer-defined field; and after the first Bluetooth device receives the broadcast packets broadcasted from the multiple second Bluetooth devices, the first Bluetooth device filters out second Bluetooth devices issued by the manufacturer according to the manufacturer-defined fields carried in the broadcast packets.

9. The method of claim 1, wherein the method further comprises: graphically showing a process of pairing connection between the first Bluetooth device and the second Bluetooth device.

\* \* \* \* \*